United States Patent
Zhang

(10) Patent No.: US 8,848,158 B2
(45) Date of Patent: Sep. 30, 2014

(54) LIQUID CRYSTAL DISPLAY DEVICE AND ASSOCIATED LIQUID CRYSTAL MEDIA FOR USE IN THE SAME

(75) Inventor: Guomin Zhang, McKinney, TX (US)

(73) Assignee: Gentex Corporation, Zeeland, MI (US)

( * ) Notice: Subject to any disclaimer, the term of this patent is extended or adjusted under 35 U.S.C. 154(b) by 597 days.

(21) Appl. No.: 12/459,470

(22) Filed: Jul. 1, 2009

(65) Prior Publication Data

US 2010/0097563 A1   Apr. 22, 2010

Related U.S. Application Data

(60) Provisional application No. 61/133,650, filed on Jul. 1, 2008.

(51) Int. Cl.
| | | |
|---|---|---|
| G02F 1/00 | (2006.01) | |
| C09K 19/00 | (2006.01) | |
| C09K 19/42 | (2006.01) | |
| C09K 19/34 | (2006.01) | |
| C09K 19/30 | (2006.01) | |

(52) U.S. Cl.
CPC ..... *C09K 19/3488* (2013.01); *C09K 2019/3075* (2013.01); *C09K 19/42* (2013.01); *C09K 19/3068* (2013.01); *C09K 2019/3004* (2013.01); *C09K 2019/3083* (2013.01)
USPC .......................................... 349/186; 349/182

(58) Field of Classification Search
CPC ... G02F 1/0045; G02F 2201/44; G02F 1/141; G02F 2202/34; G02F 1/3619; G02F 1/1523
USPC ........................................................ 349/186
See application file for complete search history.

(56) References Cited

U.S. PATENT DOCUMENTS

| | | | |
|---|---|---|---|
| 2,621,193 | A | 12/1952 | Langkammerer |
| 2,880,221 | A | 3/1959 | Haslam |
| 3,600,060 | A | 8/1971 | Churchill et al. |
| 3,642,348 | A | 2/1972 | Wysocki et al. |
| 3,720,623 | A | 3/1973 | Cartmell et al. |
| 3,795,529 | A | 3/1974 | Cartmell et al. |
| 3,814,501 | A | 6/1974 | Schindler |

(Continued)

FOREIGN PATENT DOCUMENTS

| | | | | |
|---|---|---|---|---|
| JP | 58076482 | A | * | 5/1983 |
| JP | 58076483 | A | * | 5/1983 |

(Continued)

OTHER PUBLICATIONS

D. Demus et al., "Synthesis and Properties of New Liquid Crystalline Materials," Mol. Cryst. Liq. Cryst., 63:129, (1981), 10 pages.

(Continued)

*Primary Examiner* — Kaveh Kianni
(74) *Attorney, Agent, or Firm* — Foley & Lardner LLP; Scott P. Ryan

(57) ABSTRACT

A reverse mode liquid crystal display device, including: a first substantially transparent substrate having an electrically conductive material associated therewith; a second substrate having an electrically conductive material associated therewith; an insulating layer associated with at least one of the first and second substrates; and a liquid crystal medium contained within a chamber positioned between the first and second substrates which includes a macrocyclic ether and/or a borane; and a nematic, negative dielectric anisotropic liquid crystal mixture.

17 Claims, 1 Drawing Sheet

(56) References Cited

U.S. PATENT DOCUMENTS

| | | | |
|---|---|---|---|
| 3,814,700 | A | 6/1974 | Aviram et al. |
| 3,872,050 | A | 3/1975 | Benton et al. |
| 3,876,286 | A | 4/1975 | Deutscher et al. |
| 3,932,024 | A | 1/1976 | Yaguchi et al. |
| 3,932,298 | A | 1/1976 | Labes |
| 3,975,285 | A | 8/1976 | Ohnishi et al. |
| 3,990,984 | A | 11/1976 | Barret et al. |
| 4,002,670 | A | 1/1977 | Steinstrasser |
| 4,005,928 | A | 2/1977 | Kmetz et al. |
| 4,020,002 | A * | 4/1977 | Oh .......... 252/299.64 |
| 4,066,569 | A | 1/1978 | Lim |
| 4,128,312 | A | 12/1978 | Lim et al. |
| 4,279,770 | A | 7/1981 | Inukai et al. |
| 4,297,401 | A | 10/1981 | Chern et al. |
| 4,297,491 | A | 10/1981 | Reissenweber et al. |
| 4,418,102 | A | 11/1983 | Ferrato |
| 4,425,029 | A | 1/1984 | Funada et al. |
| 4,435,037 | A | 3/1984 | Abramson et al. |
| 4,435,047 | A | 3/1984 | Fergason |
| 4,482,473 | A * | 11/1984 | Yamanashi et al. ........ 252/299.1 |
| 4,613,207 | A | 9/1986 | Fergason |
| 4,659,501 | A * | 4/1987 | Sugimori et al. .......... 252/299.5 |
| 4,671,618 | A | 6/1987 | Wu et al. |
| 4,685,771 | A | 8/1987 | West et al. |
| 4,688,900 | A | 8/1987 | Doane et al. |
| 4,695,490 | A | 9/1987 | McClelland et al. |
| 4,944,576 | A | 7/1990 | Lackep et al. |
| 4,994,204 | A | 2/1991 | Doane et al. |
| 5,056,898 | A | 10/1991 | Ma et al. |
| 5,093,735 | A | 3/1992 | Doane et al. |
| 5,188,760 | A | 2/1993 | Hikmet et al. |
| 5,270,843 | A | 12/1993 | Wang |
| 5,305,126 | A | 4/1994 | Kobayashi et al. |
| 5,403,511 | A * | 4/1995 | Onishi et al. ............. 252/299.01 |
| 5,437,811 | A | 8/1995 | Doane et al. |
| 5,596,023 | A | 1/1997 | Tsubota et al. |
| 5,596,024 | A | 1/1997 | Horie et al. |
| 5,796,454 | A | 8/1998 | Ma |
| 5,818,625 | A | 10/1998 | Forgette et al. |
| 5,920,368 | A | 7/1999 | Hatano et al. |
| 6,157,480 | A | 12/2000 | Anderson et al. |
| 6,193,378 | B1 | 2/2001 | Tonar et al. |
| 6,239,898 | B1 | 5/2001 | Byker et al. |
| 6,344,887 | B1 | 2/2002 | Ma et al. |
| 6,399,164 | B1 * | 6/2002 | Yanai et al. .................... 428/1.1 |
| 6,462,805 | B1 | 10/2002 | Wu et al. |
| 6,555,308 | B1 * | 4/2003 | Asami et al. .................. 430/567 |
| 6,816,297 | B1 | 11/2004 | Tonar et al. |
| 6,821,645 | B2 | 11/2004 | Igarashi et al. |
| 7,058,249 | B2 * | 6/2006 | Purchase et al. ................ 385/14 |
| 7,125,499 | B2 * | 10/2006 | Ferguson et al. ........ 252/299.01 |
| 7,339,641 | B2 * | 3/2008 | Zhu et al. ...................... 349/114 |
| 7,432,371 | B2 * | 10/2008 | Kriesel et al. ................. 540/474 |
| 7,468,434 | B2 * | 12/2008 | Vanhoutte et al. ........... 540/450 |
| 7,646,457 | B2 * | 1/2010 | Fukagawa et al. ........... 349/122 |
| 7,776,145 | B2 * | 8/2010 | Doi et al. ...................... 106/31.6 |
| 7,838,089 | B2 * | 11/2010 | Shibahara ...................... 428/1.1 |
| 7,872,695 | B2 * | 1/2011 | Kondou ........................... 349/17 |
| 2004/0129141 | A1 * | 7/2004 | Malik et al. ..................... 96/101 |
| 2004/0254076 | A1 * | 12/2004 | Nishida et al. ................ 504/193 |
| 2005/0059168 | A1 * | 3/2005 | Bazan et al. ................... 436/518 |
| 2005/0072960 | A1 * | 4/2005 | Ferguson et al. ........ 252/299.01 |
| 2005/0131204 | A1 * | 6/2005 | Heuer et al. ................... 528/377 |
| 2006/0238675 | A1 * | 10/2006 | Zhu et al. ....................... 349/114 |
| 2006/0264528 | A1 * | 11/2006 | Wada ............................. 522/130 |
| 2007/0146454 | A1 * | 6/2007 | Doi et al. ....................... 347/100 |
| 2007/0298006 | A1 * | 12/2007 | Tomalia et al. ............. 424/78.03 |
| 2008/0043188 | A1 * | 2/2008 | Zhu et al. ....................... 349/114 |
| 2008/0105160 | A1 * | 5/2008 | Doi et al. ....................... 106/31.6 |
| 2008/0139806 | A1 * | 6/2008 | Verkade et al. ............... 540/467 |
| 2008/0218645 | A1 * | 9/2008 | Zhu et al. ......................... 349/33 |
| 2009/0168009 | A1 * | 7/2009 | Shibahara ...................... 349/186 |
| 2010/0233629 | A1 * | 9/2010 | Wada .......................... 430/286.1 |

FOREIGN PATENT DOCUMENTS

| | | | |
|---|---|---|---|
| JP | 61083190 A | * | 4/1986 |
| JP | 61083283 A | * | 4/1986 |
| JP | 2004263242 A | * | 9/2004 |
| WO | WO-2004/098953 | | 11/2004 |

OTHER PUBLICATIONS

G. Zhang et al., "Studies on Antitumour Drugs—Synthesis of Diarylborinic 3B1-Amino Acid Anhydrides," Wuhan Univ. J. Natural Science Edition, 2:43 (1981), 9 pages. (English abstract included).

G. Zhang et al., "Studies on Boron Compounds (II)" Chemical Journal of Chinese Univ., 3:351 (1982), 8 pages. (English abstract included).

G. Zhang et al., "Study on Boron Compounds," Acta Chimica Sinnica, 36: 315 (1978), 4 pages. (English abstract included).

M.A. Osman, "Stable Liquid Crystals with Large Negative Dielectric Anisotropy—I," Mol. Cryst. Liq. Cryst., 82:295, (1982), 6 pages.

S.M. Kelly, et al., "Some Novel Nematic Materials Bearing Two Lateral Nitrile Functions," Helvetica Chimica Acta, vol. 66, Fasc. 6, 1983, 10 pages.

T. Inukai, et al., "2,3-Dicyanohydroquinone Derivative Liquid Crystals Having Strong Negative Dielectric Anistropy," Mol. Cryst. Lig. 10 Cryst., 94:109, (1983), 7 pages.

Seskauskas et al., "Dielectric Properties of 2,3-Dicyano-4-pentyloxyphenyl 4032-pentyloxybenzoate (DPP) Mixtures with Non-polar Liquid Crystals (LC)," Mol. Cryst. Liq. Cryst., 103:213, (1983), 4 pages.

Zhiyun, et al., "Catalysis of Rare Earth Heteropoly Acid," Journal of the Chinese Rare Earth Society, 2:26 (1986), 7 pages. (English abstract included).

Yang, et al., "Analysis of organometallic compounds: Thin-layer chromatography of borane anion-ferrocene-quaternary ammonium salts," Sepu, vol. 2, Issue 1, 1985, pp. 13-19. (English abstract only—machine translation).

* cited by examiner

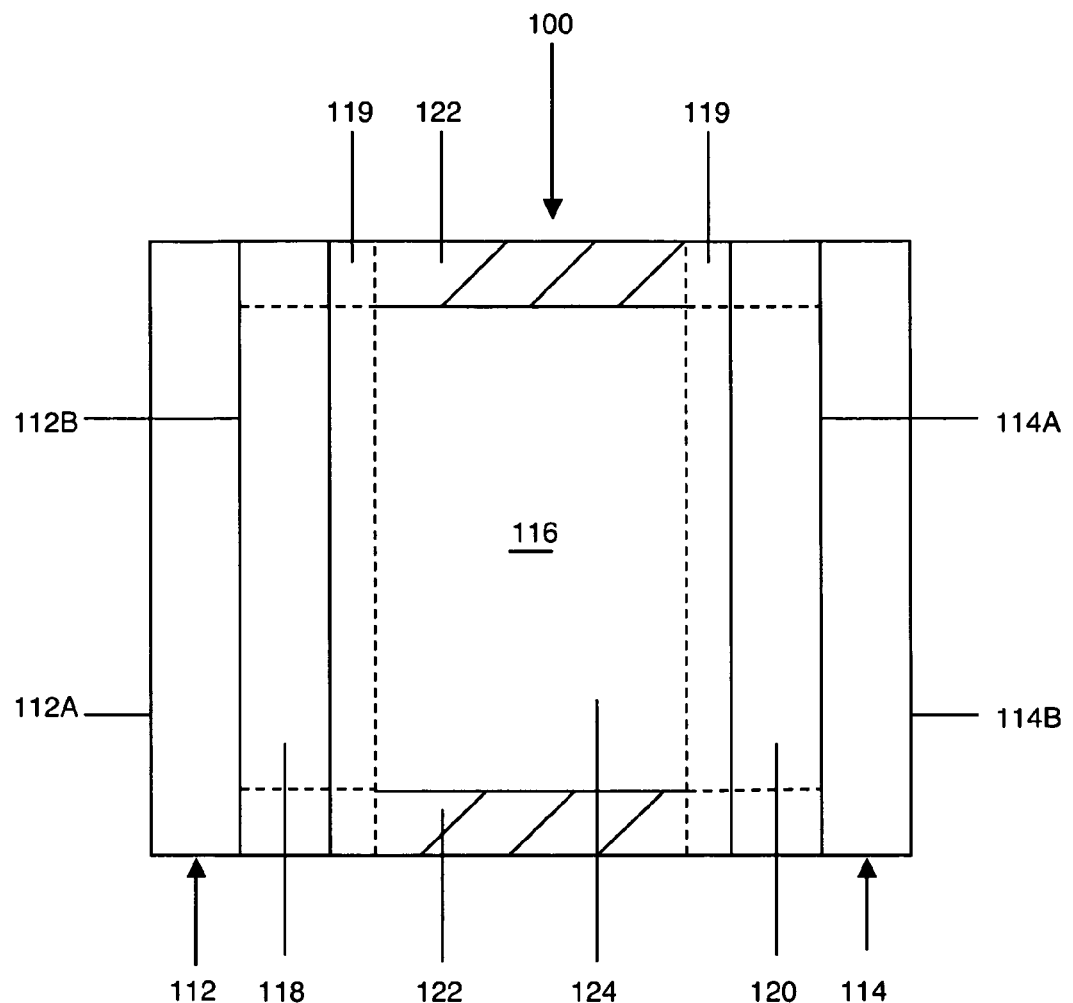

LIQUID CRYSTAL DISPLAY DEVICE AND ASSOCIATED LIQUID CRYSTAL MEDIA FOR USE IN THE SAME

CROSS-REFERENCE TO RELATED APPLICATION(S)

This application claims the benefit of U.S. Provisional Application No. 61/133,650, filed Jul. 1, 2008—which is hereby incorporated herein by reference in its entirety.

BACKGROUND OF THE INVENTION

1. Field of the Invention

The present invention relates in general to liquid crystal display technology and, in particular, to liquid crystal light shutter display devices and associated media, which are capable of transmitting and scattering light in a reverse phase display mode or reverse mode liquid crystal (hereinafter sometime referred to as "RPDM" and "RMLC," respectively). More specifically, the present invention relates to reverse mode liquid crystal display devices and associated media, which comprise macrocyclic ethers and/or boranes and nematic, negative dielectric anisotropic liquid crystal mixtures. Devices of the present invention can operate using low and/or non-lethal voltages, including less than approximately 24 volts, which is advantageous from a safety perspective relative to more conventional, high voltage systems, such as polymer dispersed liquid crystal devices (hereinafter sometime referred to as "PDLC"). Additionally, devices of the present invention can operate using AC and/or DC current, whereas older technology liquid crystal devices operated using only AC current.

2. Background Art

Liquid crystal display devices have been known in the art for several years. Furthermore, RPDM and/or RMLC devices are likewise well known. See, for example, U.S. Pat. No. 5,056,898 entitled "Reverse Mode Micro-droplet Liquid Crystal Light Shutter Displays," U.S. Pat. No. 5,305,126 entitled "Polymer-Dispersed Liquid Crystal Material With In-Situ Polymerized Liquid Crystal Polymer Grains Dispersed In A Layer Of Liquid Crystal Material Sealed Between Substrates and Field Electrodes," and U.S. Pat. No. 6,462,805 entitled "Reverse-Mode Direct-View Display Employing A Liquid Crystal Having A Characteristic Wavelength In The Non-Visible Spectrum," all of which are hereby incorporated herein by reference in their entirety—including the references cited therein.

While the above-identified references disclose RPDM and/or RMLC devices, issues relative to liquid crystal media alignment, power consumption, unstable liquid crystal mixtures, and limited operating life have resulted in general obsolescence of the technology.

It is therefore an object of the present invention, among others, to provide a reverse mode liquid crystal display device which overcomes many of the aforementioned drawbacks associated with conventional RPDM and/or RMLC devices. The present invention utilizes a liquid crystal medium which comprises: (1) a macrocyclic ether and/or a borane; and (2) a nematic, negative dielectric anisotropic liquid crystal mixture to overcome the problematic operational performance characteristics of conventional RPDM and/or RMLC devices.

These and other objects of the present invention will become apparent in light of the present specification, claims, and drawings.

SUMMARY OF THE INVENTION

The present invention is directed to, in one embodiment, a reverse mode liquid crystal display device, comprising: (a) a first substantially transparent substrate having an electrically conductive material associated therewith; (b) a second substrate having an electrically conductive material associated therewith; (c) an insulating layer associated with at least one of the first and second substrates; and (d) a liquid crystal medium contained within a chamber positioned between the first and second substrates which comprises: (1) a macrocyclic ether and/or a borane; and (2) a nematic, negative dielectric anisotropic liquid crystal mixture.

In a preferred embodiment of the present invention, the macrocyclic ether is represented by the following formula:

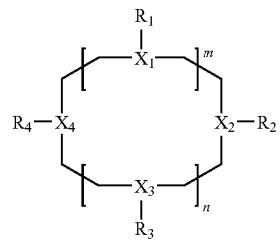

wherein $R_1$-$R_4$ are the same or different and comprise at least one of H, a straight or branched alkyl, cycloalkyl, polycycloalkyl, heterocycloalkyl, alkaryl, alkoxy, aryl, aralkyl, alkenyl, and alkynyl group containing approximately 1 to approximately 50 carbon atom(s); wherein $X_1$-$X_4$ are the same or different and comprise at least one of a group IV element, a group V element, and a group VI element; wherein m is an integer ranging from approximately 1 to approximately 10; and wherein n is an integer ranging from approximately 1 to approximately 10.

In this embodiment $R_1$-$R_4$ are the same or different and more preferably comprise at least one of H, a straight alkyl group containing approximately 1 to approximately 10 carbon atom(s); $X_1$-$X_4$ are the same or different and more preferably comprise at least one of N and O; m more preferably comprises an integer ranging from approximately 1 to approximately 7; and n more preferably comprises an integer ranging from approximately 1 to approximately 7.

In another preferred embodiment of the present invention, the macrocyclic ether is represented by the following formula:

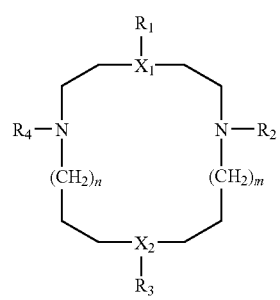

wherein $R_1$-$R_4$ are the same or different and comprise at least one of H, a straight or branched alkyl, cycloalkyl, polycycloalkyl, heterocycloalkyl, alkaryl, alkoxy, aryl, aralkyl, alkenyl, and alkynyl group containing approximately 1 to approximately 50 carbon atom(s); wherein $X_1$-$X_2$ are the same or different and comprise at least one of a group IV element, a group V element, and a group VI element; wherein m is an integer ranging from approximately 1 to approximately 5; and wherein n is an integer ranging from approximately 1 to approximately 5.

In this embodiment $R_1$-$R_4$ are the same or different and more preferably comprise at least one of H, a straight alkyl group containing approximately 1 to approximately 10 carbon atom(s); $X_1$-$X_2$ are the same or different and more preferably comprise at least one of N and O; m more preferably comprises an integer ranging from approximately 1 to approximately 2; and n more preferably comprises an integer ranging from approximately 1 to approximately 2.

In a preferred embodiment of the present invention, the borane is represented by the following formula:

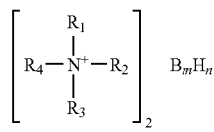

wherein $R_1$-$R_4$ are the same or different and comprise at least one of H, a straight or branched alkyl, cycloalkyl, polycycloalkyl, heterocycloalkyl, alkaryl, alkoxy, aryl, aralkyl, alkenyl, alkynyl, and metallocenyl group containing approximately 1 to approximately 50 carbon atom(s); wherein m is an integer ranging from approximately 1 to approximately 15; and wherein n is an integer ranging from approximately 1 to approximately 15.

In this embodiment $R_1$-$R_4$ are the same or different and more preferably comprise at least one of H, a straight or branched alkyl, aryl, aralkyl, and methylferrocenyl group containing approximately 1 to approximately 10 carbon atom(s); m more preferably comprises an integer ranging from approximately 9 to approximately 12; and n more preferably comprises an integer ranging from approximately 9 to approximately 12.

In another preferred embodiment of the present invention, the borane is represented by the following formula:

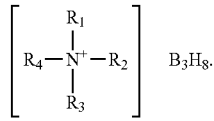

wherein $R_1$-$R_4$ are the same or different and comprise at least one of H, a straight or branched alkyl, cycloalkyl, polycycloalkyl, heterocycloalkyl, alkaryl, alkoxy, aryl, aralkyl, alkenyl, alkynyl, and metallocenyl group containing approximately 1 to approximately 50 carbon atom(s).

In this embodiment $R_1$-$R_4$ are the same or different and more preferably comprise at least one of H, a straight or branched alkyl, aryl, and aralkyl group containing approximately 1 to approximately 10 carbon atom(s).

In a preferred embodiment of the present invention, the macrocyclic ether and/or borane comprises approximately 0.1% to approximately 25% by weight of the liquid crystal medium, and more preferably from approximately 1% to approximately 5% by weight, and yet more preferably from approximately 1% to approximately 3% by weight.

In yet another preferred embodiment of the present invention, the nematic, negative dielectric anisotropic liquid crystal mixture comprises a compound represented by the following formula:

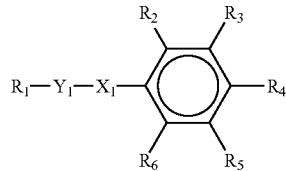

wherein $R_1$ and $R_4$ are the same or different and comprise at least one of H, a cyano group, a straight or branched alkyl, cycloalkyl, polycycloalkyl, heterocycloalkyl, alkaryl, alkoxy, aryl, aralkyl, alkenyl, alkynyl, and carboxyl group containing approximately 1 to approximately 50 carbon atom(s); wherein $R_2$, $R_3$, $R_5$, and $R_6$ are the same or different and comprise at least one of H, a cyano group, and a halide; wherein $X_1$ comprises at least one of a group IV element, a group V element, a group VI element, a carbonyl group, and a carboxyl group; and wherein $Y_1$ comprises at least one of a straight or branched alkyl, cycloalkyl, polycycloalkyl, polycycloaryl, polycycloalkaryl, polycycloaralkyl, heterocycloalkyl, alkaryl, alkoxy, aryl, aralkyl, alkenyl, alkynyl, and carboxyl group containing approximately 1 to approximately 50 carbon atom(s), and a cyano group.

In this embodiment $R_1$ and $R_4$ are the same or different and more preferably comprise at least one of a straight or branched alkyl and/or alkoxy group containing approximately 1 to approximately 10 carbon atom(s); $R_2$, $R_3$, $R_5$, and $R_6$ are the same or different and more preferably comprise at least one of H, a cyano group, and a halide; $X_1$ more preferably comprises at least one of C, CO, and COO; and $Y_1$ more preferably comprises at least one of $—(C_6H_{10})_{1-2}$ $(C_6H_4)_{1-2}—$ and $—(C_6H_{10})_{1-2}—$.

In this embodiment $R_1$ yet more preferably comprises at least one of a straight or branched alkyl group containing approximately 2 to approximately 7 carbon atom(s); $R_4$ yet more preferably comprises at least one of a straight or branched alkyl and/or alkoxy group containing approximately 2 to approximately 7 carbon atom(s); $R_2$, $R_3$, $R_5$, and $R_6$ are the same or different and yet more preferably comprise at least one of H, CN, Cl and F; $X_1$ yet more preferably comprises COO; and $Y_1$ yet more preferably comprises at least one of $—(C_6H_{10})(C_6H_4)—$ and $—(C_6H_{10})—$.

In another preferred embodiment of the present invention, the nematic, negative dielectric anisotropic liquid crystal mixture comprises a compound represented by the following formula:

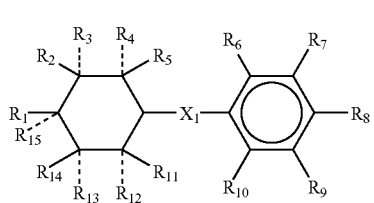

wherein $R_1$ comprises a straight or branched alkyl group containing approximately 1 to approximately 50 carbon atom(s); wherein $R_8$ comprises a straight or branched alkoxy group containing approximately 1 to approximately 50 carbon atom(s); wherein $R_{(2-7, 9-15)}$ comprise H; and wherein $X_1$ comprises at least one of a group IV element, a group V element, a group VI element, and a carboxyl group.

In this embodiment $R_1$ more preferably comprises a straight or branched alkyl group containing approximately 1 to approximately 25 carbon atom(s); $R_8$ more preferably comprises a straight or branched alkoxy group containing approximately 1 to approximately 25 carbon atom(s); $R_{(2-7, 9-15)}$ more preferably comprise H; and $X_1$ more preferably comprises at least one of C, and COO.

In this embodiment $R_1$ yet more preferably comprises a straight or branched alkyl group containing approximately 1 to approximately 7 carbon atom(s); $R_8$ yet more preferably comprises a straight or branched alkoxy group containing approximately 1 to approximately 7 carbon atom(s); $R_{(2-7, 9-15)}$ yet more preferably comprise H; and $X_1$ yet more preferably comprises COO.

In another aspect of the present invention, the nematic, negative dielectric anisotropic liquid crystal mixture comprises a compound represented by the following formula:

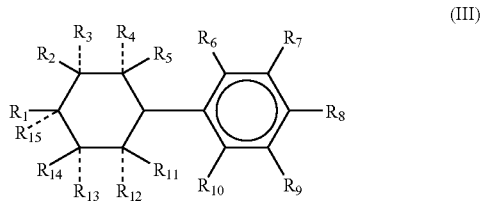

(III)

wherein $R_{(1, 8)}$ are the same or different and comprise a straight or branched alkyl group containing approximately 1 to approximately 50 carbon atom(s); and wherein $R_{(2-7, 9-15)}$ comprise H.

In this embodiment $R_1$ more preferably comprises a straight or branched alkyl group containing approximately 1 to approximately 10 carbon atom(s); $R_8$ more preferably comprises a straight or branched alkyl group containing approximately 1 to approximately 7 carbon atom(s); and $R_{(2-7, 9-15)}$ more preferably comprise H.

In this embodiment $R_1$ yet more preferably comprises a straight or branched alkyl group containing approximately 3 to approximately 5 carbon atom(s); $R_8$ yet more preferably comprises a straight or branched alkyl group containing approximately 2 to approximately 4 carbon atom(s); and $R_{(2-7, 9-15)}$ yet more comprise H.

In a preferred embodiment of the present invention, the nematic, negative dielectric anisotropic liquid crystal mixture comprises a compound represented by the following formula:

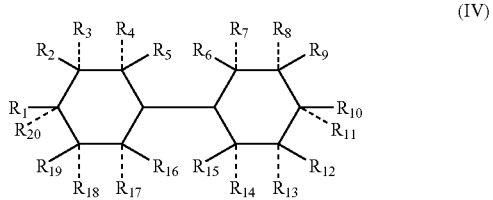

(IV)

wherein $R_{(1, 10)}$ are the same or different and comprise a straight or branched alkyl group containing approximately 1 to approximately 50 carbon atom(s); and wherein $R_{11}$ comprises a cyano group; and wherein $R_{(2-9, 12-20)}$ comprise H.

In this embodiment $R_1$ more preferably comprises a straight or branched alkyl group containing approximately 1 to approximately 10 carbon atom(s); $R_{10}$ more preferably comprises a straight or branched alkyl group containing approximately 1 to approximately 7 carbon atom(s); $R_{11}$ more preferably comprises a cyano group; and $R_{(2-9, 12-20)}$ more preferably comprise H.

In this embodiment $R_1$ yet more preferably comprises a straight or branched alkyl group containing approximately 3 to approximately 7 carbon atom(s); $R_{10}$ yet more preferably comprises a straight or branched alkyl group containing approximately 2 to approximately 4 carbon atom(s); $R_{11}$ yet more preferably comprises a cyano group; and $R_{(2-9, 12-20)}$ yet more preferably comprise H.

In another preferred embodiment of the present invention, the nematic, negative dielectric anisotropic liquid crystal mixture comprises: approximately 10% to approximately 50% by weight of a compound represented by formula (I); approximately 20% to approximately 70% by weight of a compound represented by formula (II); approximately 5% to approximately 15% by weight of a compound represented by formula (III); and/or approximately 5% to approximately 15% by weight of a compound represented by formula (IV). It will be understood that additional mixture configurations are likewise contemplated for use in accordance with the present invention.

In yet another aspect of the present invention, the dielectric anisotropy $\Delta_E$ of the nematic, negative dielectric anisotropic liquid crystal mixture ranges preferably from approximately −1.0 to approximately −5.0, more preferably from approximately −1.0 to approximately −3.0, and yet more preferably from approximately −1.0 to approximately −2.5.

BRIEF DESCRIPTION OF THE DRAWINGS

Certain embodiments of the present invention are illustrated by the accompanying FIGURE. It will be understood that the FIGURE is not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein:

FIG. 1 of the drawings is a cross-sectional schematic representation of a liquid crystal display device fabricated in accordance with the present invention.

DETAILED DESCRIPTION OF THE INVENTION

Referring now to the drawings and to FIG. 1 in particular, a cross-sectional schematic representation of reverse mode liquid crystal display device 100 is shown, which generally comprises first substrate 112 having front surface 112A and rear surface 112B, second substrate 114 having front surface 114A and rear surface 114B, and chamber 116 for containing liquid crystal medium 124 which generally comprises a macrocyclic ether and/or a borane and a nematic, negative dielectric anisotropic liquid crystal mixture. It will be understood that reverse mode liquid crystal display device 100 may comprise, for illustrative purposes only, a light shutter device for transmitting and scattering light, an architectural privacy screen, a display device, and the like. It will be further understood that FIG. 1 is merely a schematic representation of reverse mode liquid crystal display device 100. As such, some of the components have been distorted from their actual scale for pictorial clarity. Indeed, numerous other liquid crystal display device configurations are contemplated for use, including those disclosed in U.S. Pat. No. 5,056,898 entitled "Reverse Mode Micro-droplet Liquid Crystal Light Shutter Displays," U.S. Pat. No. 5,305,126 entitled "Polymer-Dispersed Liquid Crystal Material With In-Situ Polymerized Liquid Crystal Polymer Grains Dispersed In A Layer Of Liquid Crystal Material Sealed Between Substrates and Field Electrodes," U.S. Pat. No. 6,462,805 entitled "Reverse-Mode Direct-View Display Employing A Liquid Crystal Having A Characteristic Wavelength In The Non-Visible Spectrum," all of which are hereby incorporated herein by reference in their entirety—including the references cited therein.

First substrate 112 may be fabricated from any one of a number of materials that are transparent or substantially transparent in the visible region of the electromagnetic spectrum, such as, for example, borosilicate glass, soda lime glass, natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, as well as Topas®, which is commercially available from Ticona of Summit, N.J. First substrate 112 is preferably fabricated from a sheet of glass or plastic having a thickness ranging from approximately 0.1 millimeters (mm) to approximately 12.7 mm, and more preferably less than approximately 1 mm for certain low weight applications. Of course, the thickness of the substrate will depend largely upon the particular application of the reverse mode liquid crystal display device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, reverse mode liquid crystal display devices in accordance with the present invention can be, during normal operation, exposed to extreme temperature variation as well as substantial UV radiation, emanating primarily from the sun. It will be further understood that first substrate 112 and/or second substrate 114 may comprise a UV absorbing layer and/or contain a UV absorbing material to help protect the substrate(s) and/or the liquid crystal layer from UV damage.

Second substrate 114 may be fabricated from similar materials as that of first substrate 112. However, if the reverse mode liquid crystal display device is a privacy display, then the requisite of substantial transparency is not necessary. As such, second substrate 114 may, alternatively, comprise polymers, metals, glass, and ceramics—to name a few. Second substrate 114 is preferably fabricated from a sheet of glass or plastic having a thickness ranging from approximately 0.1 mm to approximately 12.7 mm, and more preferably less than approximately 1 mm for certain low weight applications. If first and second substrates 112 and 114, respectively, are fabricated from sheets of glass, then the glass can optionally be tempered, heat strengthened, and/or chemically strengthened, and/or laminated prior to or subsequent to being coated with layers of electrically conductive material (118 and 120) and/or insulating material (119).

Additionally, the substrates of the present invention can be treated or coated as is described in U.S. Pat. No. 6,239,898, entitled "Electrochromic Structures," U.S. Pat. No. 6,193,378, entitled "Electrochromic Device Having A Self-Cleaning Hydrophilic Coating," and U.S. Pat. No. 6,816,297 entitled "Electrochromic Mirror Having A Self-Cleaning Hydrophilic Coating," the entire disclosures of which are hereby incorporated herein by reference in their entirety including the references cited therein. Other treatments, such as anti-reflectance coatings, low-E coatings, and UV-blocking layers are also contemplated for use in accordance with the present invention.

One or more layers of electrically conductive material 118 are associated with rear surface 112B of first substrate 112. These layers serve as an electrode for the reverse mode liquid crystal display device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the reverse mode liquid crystal display device or the atmosphere; and (e) exhibits minimal diffuse or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide, indium zinc oxide, metal oxide/Ag/metal oxide, or other materials known to those having ordinary skill in the art.

Insulating layer/film 119 at least partially covers the inner surface, proximate chamber 116, of electrically conductive material 118. While insulating layer/film 119 has been disclosed as being associated with electrically conductive material 118, it is likewise contemplated that insulating layer/film 119 can, alternatively or additionally, be associated with electrically conductive material 120—depending upon the device configuration. It will be understood that insulating layer/film 119 comprises a dielectric layer fabricated from any one of a number of materials including, but not limited to, $SiO_2$, $TiO_2$, $Al_2O_3$ $Ta_2O_5$, $ZnO_2$, polyimides, polyamideimides, transitional metal oxides or combinations thereof—just to name a few. It will be further understood that insulating layer 119 may be applied using conventional techniques such as, sputtering, chemical vapor deposition (CVD), plasma enhanced CVD, dip coating, spinning, printing, sol-gel methods, among others. Preferably, insulating layer/film 119 ranges in thickness from approximately 0.05 microns to approximately 25 microns, and more preferably between approximately 0.1 micron and approximately 1 micron. It will be understood that the denser and/or harder the dielectric film, the thinner the layer is required to provide isolation between the front and rear electrodes.

Electrically conductive material 120 is preferably associated with front surface 114A of second substrate 114, and is operatively bonded to electrically conductive material 118 by sealing member 122. As can be seen in FIG. 1, once bonded, sealing member 122 and the juxtaposed portions of electrically conductive materials 118 and 120 (including insulating layer(s) 119) serve to define an inner peripheral geometry of chamber 116. Alternatively, edge sealing techniques may be utilized which are disclosed in U.S. patent application Ser. No. 60/548,472 entitled "Vehicular Rearview Mirror Elements and Assemblies Incorporating These Elements," which is hereby incorporated herein by reference in its entirety.

Electrically conductive material 120 may vary depending upon the intended use of the reverse mode liquid crystal display device. For example, if the reverse mode liquid crystal display device includes mirrored qualities, then the material may comprise a transparent conductive coating similar to electrically conductive material 118 (in which case a reflector may be associated with rear surface 114B of second substrate 114). Alternatively, electrically conductive material 120 may comprise a layer of reflective material in accordance with the teachings of U.S. Pat. No. 5,818,625, which is hereby incorporated herein by reference in its entirety including the references cited therein. In this case, electrically conductive material 120 is associated with front surface 114A of second substrate 114. Typical coatings for this type of reflector include chromium, rhodium, ruthenium, silver, silver alloys, and combinations thereof.

Sealing member 122 may comprise any material that is capable of being adhesively bonded to the electrically conductive materials 118 and 120 to, in turn, seal chamber 116 so that liquid crystal medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 (including insulating layer(s) 119) may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in: U.S. Pat. No. 4,297,401 entitled "Liquid Crystal Display And Photopolymerizable Sealant Therefor," U.S. Pat. No. 4,418,102 entitled "Liquid Crystal Displays Having Improved Hermetic Seal," U.S. Pat. No. 4,695,490 entitled "Seal For Liquid Crystal Display," U.S. Pat. No. 5,596,023 entitled "Sealing Material For Liquid Crystal Display Panel, And Liquid Crystal Display Panel Using It," U.S. Pat. No. 5,596,024 entitled "Sealing Composition For Liquid Crystal," and U.S. Pat. No. 6,157,480 entitled "Seal For Electrochromic Devices," all of which are hereby incorporated herein by reference in their entirety—including the references cited therein.

For purposes of the present disclosure, liquid crystal medium 124 comprises a macrocyclic ether and/or a borane and at least one nematic, negative dielectric anisotropic liquid crystal compound.

In one embodiment of the present invention, the macrocyclic ether is represented by the following formula:

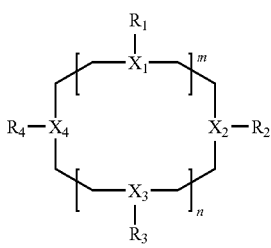

wherein $R_1$-$R_4$ are the same or different and comprise at least one of H, a straight or branched alkyl, cycloalkyl, polycycloalkyl, heterocycloalkyl, alkaryl, alkoxy, aryl, aralkyl, alkenyl, and alkynyl group containing approximately 1 to approximately 50 carbon atom(s); wherein $X_1$-$X_4$ are the same or different and comprise at least one of a group IV element, a group V element, and a group VI element; wherein m is an integer ranging from approximately 1 to approximately 10; and wherein n is an integer ranging from approximately 1 to approximately 10.

More specifically, $R_1$-$R_4$ are the same or different and preferably comprise at least one of H, a straight alkyl group containing approximately 1 to approximately 10 carbon atom(s); $X_1$-$X_4$ are the same or different and preferably comprise at least one of N and O; m preferably comprises an integer ranging from approximately 1 to approximately 7; and n preferably comprises an integer ranging from approximately 1 to approximately 7.

In another preferred embodiment of the present invention, the macrocyclic ether is represented by the following formula:

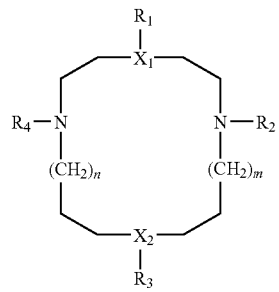

wherein $R_1$-$R_4$ are the same or different and comprise at least one of H, a straight or branched alkyl, cycloalkyl, polycycloalkyl, heterocycloalkyl, alkaryl, alkoxy, aryl, aralkyl, alkenyl, and alkynyl group containing approximately 1 to approximately 50 carbon atom(s); wherein $X_1$-$X_2$ are the same or different and comprise at least one of a group IV element, a group V element, and a group VI element; wherein m is an integer ranging from approximately 1 to approximately 5; and wherein n is an integer ranging from approximately 1 to approximately 5.

More specifically, $R_1$-$R_4$ are the same or different and preferably comprise at least one of H, a straight alkyl group containing approximately 1 to approximately 10 carbon atom(s); $X_1$-$X_2$ are the same or different and preferably comprise at least one of N and O; m preferably comprises an integer ranging from approximately 1 to approximately 2; and n preferably comprises an integer ranging from approximately 1 to approximately 2.

In one embodiment of the present invention, the borane is represented by the following formula:

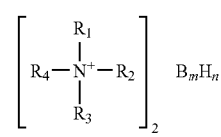

wherein $R_1$-$R_4$ are the same or different and comprise at least one of H, a straight or branched alkyl, cycloalkyl, polycycloalkyl, heterocycloalkyl, alkaryl, alkoxy, aryl, aralkyl, alkenyl, alkynyl, and metallocenyl group containing approximately 1 to approximately 50 carbon atom(s); wherein m is an integer ranging from approximately 1 to approximately 15; and wherein n is an integer ranging from approximately 1 to approximately 15.

More specifically, $R_1$-$R_4$ are the same or different and preferably comprise at least one of H, a straight or branched alkyl, aryl, aralkyl, and methylferrocenyl group containing approximately 1 to approximately 10 carbon atom(s); m preferably comprises an integer ranging from approximately 9 to approximately 12; and n preferably comprises an integer ranging from approximately 9 to approximately 12.

In another preferred embodiment of the present invention, the borane is represented by the following formula:

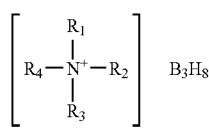

wherein $R_1$-$R_4$ are the same or different and comprise at least one of H, a straight or branched alkyl, cycloalkyl, polycycloalkyl, heterocycloalkyl, alkaryl, alkoxy, aryl, aralkyl, alkenyl, alkynyl, and metallocenyl group containing approximately 1 to approximately 50 carbon atom(s).

More specifically, $R_1$-$R_4$ are the same or different and preferably comprise at least one of H, a straight or branched alkyl, aryl, and aralkyl group containing approximately 1 to approximately 10 carbon atom(s).

It will be understood that the macrocyclic ethers and/or a boranes provided herein, not only possess valuable compatibility characteristics with liquid crystal materials but are also often substantially rod-like polar molecules. As such, upon application of an electrical potential and/or field, these polar organometallic molecules are induced, thereby causing the associated liquid crystal medium to exhibit turbulent characteristics and light is strongly scattered.

Preferably the concentration of the macrocyclic ethers and/or boranes comprises approximately 0.1% to approximately 25% by weight of the liquid crystal medium, and more preferably from approximately 1% to approximately 5% by weight, and yet more preferably from approximately 1% to approximately 3% by weight.

Provided below is a synthesis for a macrocyclic ether, as well as references for the preparation of a plurality of other macrocyclic ethers.

Preparation of 1,4,7,10,13,16-Hexaazacyclooctadecane

A three-neck, round-bottom flask equipped with a mechanical stirrer, nitrogen inlet, and addition funnel was charged with 200 g (0.169 mole) of 1,4,7,10,13,16-Hexakis (p-tolylsulfonyl)-1,4,7,10,13,16-hexaazacyclooctadecane and 500 ml of concentrated (97%) sulfuric acid. The stirred mixture is held at 100° C. for 70 hours, and then cooled in ice as 1300 ml of anhydrous diethyl ether was slowly added. The precipitated polyhydrosulfate salt was filtered under nitrogen and washed with anhydrous ether. The salt was then stirred in 200 ml of water and cooled in ice as 71 ml of aqueous 50% sodium hydroxide was added to neutralize the solution. 3 g of activated carbon was added, and the solution was heated to 80° C. and filtered through Celite. The filtrate was cooled in ice and reacidified to pH 1 by adding 42 ml of concentrated sulfuric acid. The white, nonhygroscopic tris(sulfuric acid) salt of 1,4,7,10,13,16-Hexaazacyclooctadecane that precipitated was collected and washed with 95% ethanol.

A multi-neck, round-bottom flask equipped with a magnetic stir and cooled in ice was charged with the above-prepared salt, 200 ml of water, and 400 ml of 50% sodium hydroxide solution. The resulting mixture was continuously extracted with tetrahydrofuran for 4 days. The extract was concentrated to dryness at reduced pressure, and 1,4,7,10,13,16-hexaazacyclooctadecane was recrystallized from acetonitrile (30 ml per g), giving 19-22 g (49-50%) of long, white needles, m.p. 147-150° C.

The syntheses and/or commercial source of numerous other macrocyclic ethers are provided in the following references, namely: J. E. Richman et al., Am. Chem. Soc., 96:2268 (1974) and W. Rasshofer et al., Justus Liebigs Ann. Chem., 916 (1976)—all of which are hereby incorporated herein by reference in their entirety—including the references cited therein.

Provided below is a synthesis for a borane, as well as references for the preparation of a plurality of other boranes.

Preparation of Bis-(tetraethylammonium) hydroborate 16.5 g (0.07 mole) of tetraethylammonium chloride with 4 moles of hydrate water and 8.1 g (0.15 moles) of potassium borohydride was grinded to powder. 6 ml of water was then added and mixed to generate a slurry. The mixture was poured into an Erlenmeyer flask equipped with thermometer, and heated in a oil bath (186° C.) for 16 hours. Then 100 ml of acetonitrile was added into the resulting mixture. The mixture was next refluxed for 1 hour, filtered, and the filtrate was concentrated to 40 ml, and finally cooled to 0° C. for filtering. 15 ml of water was added to the residue. After boiling a few minutes, the residue was filtered and dried. 0.3 g of $(Et_4N)_2B_{12}H_{12}$ was obtained. The filtrate was evaporated and a white solid was obtained. Then 30 ml of anhydrous ethyl alcohol was added, refluxed 0.5 hour, and after cooling to room temperature, 2.1 g of $(Et_4N)_2B_{10}H_{10}$ was obtained by filtration, yield 79% (recrystallization from methyl alcohol.)

The syntheses and/or commercial source of numerous other boranes are provided in the following references, namely: G. Zhang et al., Acta Chimica Sinnica, 36:315 (1978), G. Zhang et al., Natural Science Edition, 2:43 (1981), G. Zhang et al., Chemical Journal of Chinese Univ., 3:351 (1982), G. Zhang et al., Journal of The Chinese Rare Earth Society, 2:26 (1986), and G. Zhang et al., Journal of Inorganic Chemistry 2:13 (1985)—all of which are hereby incorporated herein by reference in their entirety—including the references cited therein.

In accordance with the present invention, the liquid crystal media preferably include one or more nematic, negative dielectric anisotropic liquid crystal compounds which form a liquid crystal mixture. Preferably the liquid crystal mixture comprises one or more compounds represented by formulae (I)-(IV) provided herein below.

In one embodiment of the present invention, the nematic, negative dielectric anisotropic liquid crystal mixture comprises a compound represented by the following formula:

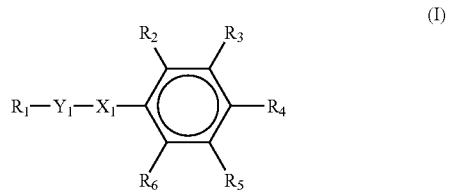

wherein $R_1$ and $R_4$ are the same or different and comprise at least one of H, a cyano group, a straight or branched alkyl, cycloalkyl, polycycloalkyl, heterocycloalkyl, alkaryl, alkoxy, aryl, aralkyl, alkenyl, alkynyl, and carboxyl group containing approximately 1 to approximately 50 carbon atom(s); wherein $R_2$, $R_3$, $R_5$, and $R_6$ are the same or different and comprise at least one of H, a cyano group, and a halide; wherein $X_1$ comprises at least one of a group IV element, a group V element, a group VI element, a carbonyl group, and a carboxyl group; and wherein $Y_1$ comprises at least one of a straight or branched alkyl, cycloalkyl, polycycloalkyl, polycycloaryl, polycycloalkaryl, polycycloaralkyl, heterocycloalkyl, alkaryl, alkoxy, aryl, aralkyl, alkenyl, alkynyl, and carboxyl group containing approximately 1 to approximately 50 carbon atom(s), and a cyano group.

More specifically, $R_1$ and $R_4$ are the same or different and preferably comprise at least one of a straight or branched alkyl and/or alkoxy group containing approximately 1 to approximately 10 carbon atom(s); $R_2$, $R_3$, $R_5$, and $R_6$ are the same or different and preferably comprise at least one of H, a cyano group, and a halide; $X_1$ preferably comprises at least one of C, CO, and COO; and $Y_1$ preferably comprises at least one of $—(C_6H_{10})_{1-2}(C_6H_4)_{1-2}—$ and $—(C_6H_{10})_{1-2}—$.

Yet more specifically, $R_1$ preferably comprises at least one of a straight or branched alkyl group containing approximately 2 to approximately 7 carbon atom(s); $R_4$ preferably comprises at least one of a straight or branched alkyl and/or alkoxy group containing approximately 2 to approximately 7 carbon atom(s); $R_2$, $R_3$, $R_5$, and $R_6$ are the same or different and preferably comprise at least one of H, CN, Cl and F; $X_1$ preferably comprises COO; and $Y_1$ preferably comprises at least one of $—(C_6H_{10})(C_6H_4)—$ and $—(C_6H_{10})—$.

In another embodiment of the present invention, the nematic, negative dielectric anisotropic liquid crystal mixture comprises a compound represented by the following formula:

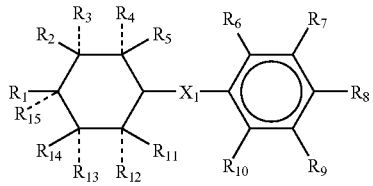

(II)

wherein $R_1$ comprises a straight or branched alkyl group containing approximately 1 to approximately 50 carbon atom(s); wherein $R_8$ comprises a straight or branched alkoxy group containing approximately 1 to approximately 50 carbon atom(s); wherein $R_{(2-7, 9-15)}$ comprise H; and wherein $X_1$ comprises at least one of a group IV element, a group V element, a group VI element, and a carboxyl group.

More specifically, $R_1$ preferably comprises a straight or branched alkyl group containing approximately 1 to approximately 25 carbon atom(s); $R_8$ preferably comprises a straight or branched alkoxy group containing approximately 1 to approximately 25 carbon atom(s); $R_{(2-7, 9-15)}$ preferably comprise H; and $X_1$ preferably comprises at least one of C, and COO.

Yet more specifically, $R_1$ preferably comprises a straight or branched alkyl group containing approximately 1 to approximately 7 carbon atom(s); $R_8$ preferably comprises a straight or branched alkoxy group containing approximately 1 to approximately 7 carbon atom(s); $R_{(2-7, 9-15)}$ preferably comprise H; and $X_1$ preferably comprises COO.

In yet another embodiment of the present invention, the nematic, negative dielectric anisotropic liquid crystal mixture comprises a compound represented by the following formula:

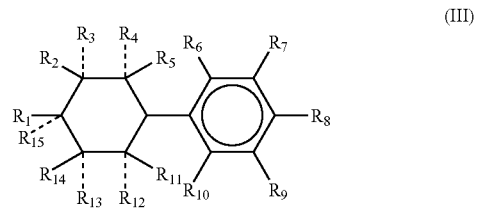

(III)

wherein $R_{(1,8)}$ are the same or different and comprise a straight or branched alkyl group containing approximately 1 to approximately 50 carbon atom(s); and wherein $R_{(2-7, 9-15)}$ comprise H.

More specifically, $R_1$ preferably comprises a straight or branched alkyl group containing approximately 1 to approximately 10 carbon atom(s); $R_8$ preferably comprises a straight or branched alkyl group containing approximately 1 to approximately 7 carbon atom(s); and $R_{(2-7, 9-15)}$ preferably comprise H.

Yet more specifically, $R_1$ preferably comprises a straight or branched alkyl group containing approximately 3 to approximately 5 carbon atom(s); $R_8$ preferably comprises a straight or branched alkyl group containing approximately 2 to approximately 4 carbon atom(s); and $R_{(2-7, 9-15)}$ preferably comprise H.

In one aspect of the present invention, the nematic, negative dielectric anisotropic liquid crystal mixture comprises a compound represented by the following formula:

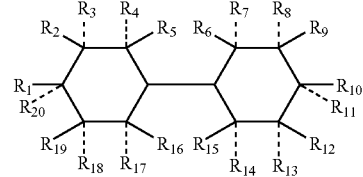

(IV)

wherein $R_{(1, 10)}$ are the same or different and comprise a straight or branched alkyl group containing approximately 1 to approximately 50 carbon atom(s); and wherein $R_{11}$ comprises a cyano group; and wherein $R_{(2-9, 12-20)}$ comprise H.

More specifically, $R_1$ preferably comprises a straight or branched alkyl group containing approximately 1 to approximately 10 carbon atom(s); $R_{10}$ preferably comprises a straight or branched alkyl group containing approximately 1 to approximately 7 carbon atom(s); $R_{11}$ preferably comprises a cyano group; and $R_{(2-9, 12-20)}$ preferably comprise H.

Yet more specifically, $R_1$ preferably comprises a straight or branched alkyl group containing approximately 3 to approximately 7 carbon atom(s); $R_{10}$ preferably comprises a straight or branched alkyl group containing approximately 2 to approximately 4 carbon atom(s); $R_{11}$ preferably comprises a cyano group; and $R_{(2-9, 12-20)}$ preferably comprise H.

It will be understood that the nematic, negative dielectric anisotropic liquid crystal mixture, in one embodiment, preferably comprises approximately 10% to approximately 50% by weight of a compound represented by formula (I); approximately 20% to approximately 70% by weight of a compound represented by formula (II): approximately 5% to approximately 15% by weight of a compound represented by formula (III): and/or approximately 5% to approximately 15% by weight of a compound represented by formula (IV).

It will be further understood that additional mixture configurations are likewise contemplated for use in accordance with the present invention.

As will be discussed in greater detail herein below, the dielectric anisotropy $\Delta_E$ of the nematic, negative dielectric anisotropic liquid crystal mixture preferably ranges from approximately −1.0 to approximately −5.0, more preferably from approximately −1.0 to approximately −3.0, and yet more preferably from approximately −1.0 to approximately −2.5.

Provided below are syntheses for two nematic, negative dielectric anisotropic liquid crystal compounds, as well as references for the preparation of a plurality of other nematic, negative dielectric anisotropic liquid crystal compounds.

Preparation of 4-n-pentyl-2-cyanophenyl 4'-n-pentyl-4-biphenyl-1-carboxylate

A 250 ml three-necked flask equipped with a mechanical stirrer, a dropping funnel, and a reflux condenser with a dry tube was charged with 9.5 g (0.05 moles) of 2-cyano-4-n-pentylphenol, 20 ml of anhydrous toluene and 30 ml of anhydrous triethylamine. While heating 13.4 g (0.05 moles) of 4-n-pentyl-4'-carboxybiphenyl was slowly added drop wise with agitation. Next, the mixture was heated under reflux for 3 hours. The resulting mixture was then cooled to room temperature, and filtered to remove the precipitate. Toluene was then evaporated from the filter liquor, and a viscous residue was purified by silica gel column chromatography. (Eluent: dichlomethane:petroleum ether=1:1, to give 16.4 g of 4-n-pentyl-2-cyanophenyl, 4'-n-pentyl-4-biphenyl-1-carboxylate.

Preparation of Bis-(Trans-4-n-Butylcyclohexanecarboxylic Acid)-2,3-Dicyano-1,4 Hydroquinone Ester A 50 ml 3-neck flask equipped with a mechanical stirrer and a reflux condenser with a dry tube was charged with 1.84 g (0.01 moles) of trans-4-n-butylcyclocarboxylic acid and 10 ml of thionyl chloride. The reaction mixture was heated under reflux for 1.5 hours. Excess thionyl chloride was evaporated and a small amount of toluene was charged to the flask. The toluene was then evaporated to give 4-n-butylcyclohexanecarbonyl chloride, a brown liquid. Then to the flask 0.8 g (0.005 moles) of 2,3-dicyanohydroquinone, 5 ml of toluene and 7 g of pyridine was added while being heated and agitated. After refluxing for 2 hours the resultant was washed with dilute hydrochloric acid three times and dried over anhydrous magnesium sulfate. Toluene was evaporated, and the residue was recrystallized from ethanol and decolorized with activated charcoal to give 1.7 g of bis-(trans-4-n-butylcyclohexanecarboxylic acid)-2,3-dicyano1,4-hydroquinone ester.

The syntheses and/or commercial source of numerous other nematic, negative dielectric anisotropic liquid crystal compounds are provided in the following references, namely: U.S. Pat. No. 4,279,770 entitled "Liquid Crystal 2,3-dicaynohydroquinone Derivatives," T. Inukai, et al., Mol. Cryst. Liq. Cryst., 94:109, (1983), M. A. Osman, Mol. Cryst. Liq. Cryst., 82:295, (1982), D. Demus et al., Mol. Cryst. Liq. Cryst., 63:129, (1981), V. Seskauskas et al., Mol. Cryst. Liq. Cryst., 94:103, (1983), and S. M. Kelly et al., Lelv. Chim. Acta., 66:1850 (1983)—all of which are hereby incorporated herein by reference in their entirety—including the references cited therein.

Example 1

Liquid Crystal Mixture

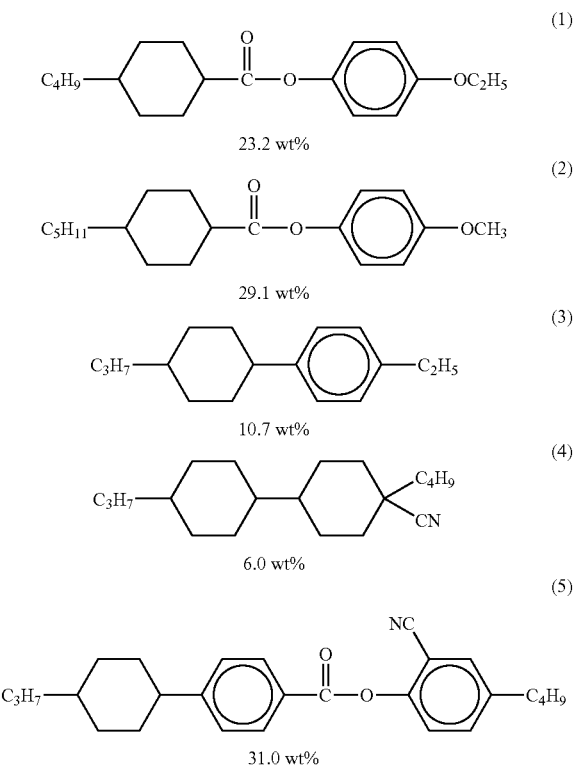

Example 2

Liquid Crystal Mixture

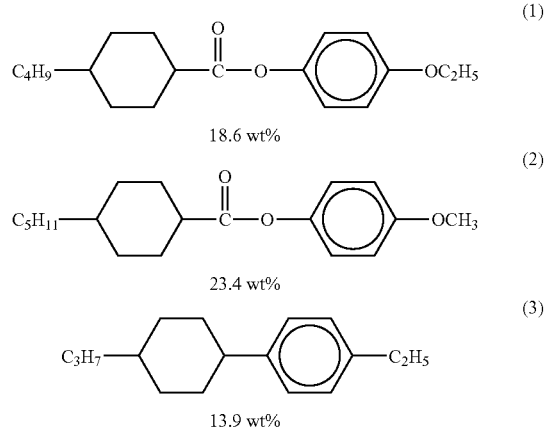

-continued

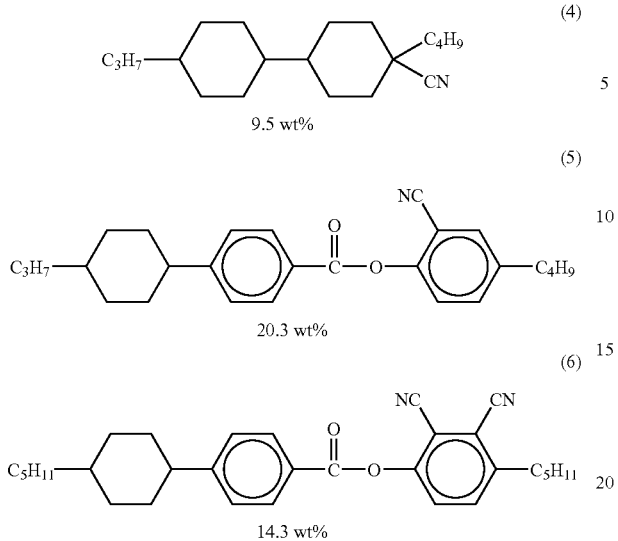

A liquid crystal medium is prepared by adding 98-99 wt % of the liquid crystal mixture provided in Example 1 and/or 2 and 0.5-2.0 wt % of 1,4,7,10,13,16-hexaazacyclooctadecane and/or bis-(tetraethylammonium) hydroborate into a reaction vessel which is agitated and heated to an isotropic liquid crystal state. The mixture is then cooled to room temperature slowly and charged into a reverse mode liquid crystal display device.

It will be understood that compounds 1, 2, and 4 are commercially available from Xianghua Chem-Tech, LTD. (China), compound 3 is commercially available from Yantai Fine Chemical Co., LTD. (China), and compounds 5 and 6 are available from Phentex Corporation (USA).

TABLE II

Provided below in Table II are the dielectric anisotropy $\Delta_E$ values for compounds 1-6 provided herein above.

| Compound No. | $\Delta_E$ value |
|---|---|
| 1 | −0.10 |
| 2 | −0.08 |
| 3 | −1.50 |
| 4 | −4.90 |
| 5 | −4.20 |
| 6 | −13.5 |

In addition, liquid crystal medium 124 may comprise other materials, such as light absorbers, UV stabilizers, thermal stabilizers, antioxidants, thickeners, viscosity modifiers, tint providing agents, redox buffers, electron shuttles, and mixtures thereof.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:
1. A reverse mode liquid crystal display device, comprising:
a first substantially transparent substrate having an electrically conductive material associated therewith;
a second substrate having an electrically conductive material associated therewith; and
a liquid crystal medium contained within a chamber positioned between the first substrate and the second substrate, the liquid crystal medium comprising:
a nematic, negative dielectric anisotropic liquid crystal; and
a macrocyclic compound, a borane, or a combination of any two or more thereof; wherein:
the macrocyclic compound is represented as:

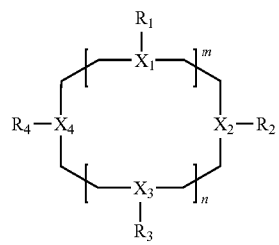

$X_1$-$X_4$ of the macrocyclic compound are individually O or N;
$R_1$-$R_4$ of the macrocyclic compound are individually H, $C_1$-$C_{10}$ alkyl, $C_1$-$C_{10}$ cycloalkyl, $C_1$-$C_{10}$ heterocycloalkyl, $C_1$-$C_{10}$ alkaryl, or $C_1$-$C_{10}$ aryl, or where any of $X_1$-$X_4$ is O, the corresponding $R_1$-$R_4$ is absent;
m of the macrocyclic compound is 1, 2, 3, 4, or 5;
n of the macrocyclic compound is 1, 2, 3, 4, or 5;
the borane is represented as:

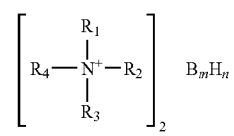

$R_1$-$R_4$ of the borane are individually H, $C_1$-$C_{10}$ alkyl, $C_1$-$C_{10}$ cycloalkyl, $C_1$-$C_{10}$ heterocycloalkyl, $C_1$-$C_{10}$ alkaryl, or $C_1$-$C_{10}$ aryl;
m of the borane is an integer of 1 to 15, inclusive; and
n of the borane is an integer of 1 to 15, inclusive.
2. The reverse mode liquid crystal display device of claim 1 comprising the macrocyclic compound, wherein:
$X_1$-$X_4$ of the macrocyclic compound are individually O;
$R_1$-$R_4$ of the macryocyclic compound are absent;
m of the macrocyclic compound is 1 or 2; and
n of the macrocyclic compound is 1 or 2.
3. The reverse mode liquid crystal display device of claim 1, wherein:
$R_1$-$R_4$ of the borane are individually $C_1$-$C_{10}$ alkyl;
m of the borane is 9, 10, 11, or 12; and
n of the borane is 9, 10, 11, or 12, inclusive.
4. The reverse mode liquid crystal display device of claim 1, wherein the borane is:

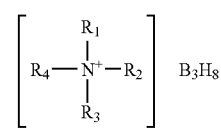

wherein: $R_1$-$R_4$ of the borane are $C_1$-$C_{10}$ alkyl.

5. The reverse mode liquid crystal display device of claim 1, wherein the nematic, negative dielectric anisotropic liquid crystal mixture comprises a compound represented by the following formula:

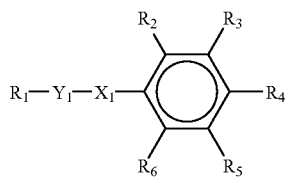

(I)

wherein $R_1$ and $R_4$ of the compound of Formula I are individually H, a cyano group, a straight or branched alkyl, cycloalkyl, polycycloalkyl, heterocycloalkyl, alkaryl, alkoxy, aryl, aralkyl, alkenyl, alkynyl, or carboxyl group containing 1 to 50 carbon atom(s); wherein $R_2$, $R_3$, $R_5$, and $R_6$ of the compound of Formula I are individually H, a cyano group, or a halide; wherein $X_1$ comprises at least one of a group IV element, a group V element, a group VI element, a carbonyl group, and a carboxyl group; and wherein $Y_1$ comprises at least one of a straight or branched alkyl, cycloalkyl, polycycloalkyl, polycycloaryl, polycycloalkaryl, polycycloaralkyl, heterocycloalkyl, alkaryl, alkoxy, aryl, aralkyl, alkenyl, alkynyl, and carboxyl group containing 1 to 50 carbon atom(s), and a cyano group.

6. The reverse mode liquid crystal display device of claim 1, wherein the nematic, negative dielectric anisotropic liquid crystal mixture comprises a compound represented by the following formula:

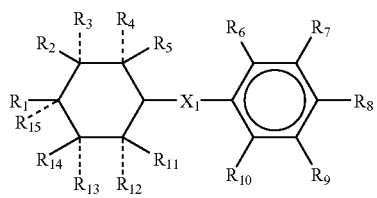

(II)

wherein $R_1$ of the compound of Formula II is a straight or branched alkyl group containing 1 to 50 carbon atom(s); wherein $R_8$ of the compound of Formula II is a straight or branched alkoxy group containing 1 to 50 carbon atom(s); wherein $R_{(2-7,\ 9-15)}$ of the compound of Formula II are individually H; and wherein $X_1$ is at least one of a group IV element, a group V element, a group VI element, and a carboxyl group.

7. The reverse mode liquid crystal display device of claim 1, wherein the nematic, negative dielectric anisotropic liquid crystal mixture comprises a compound represented by the following formula:

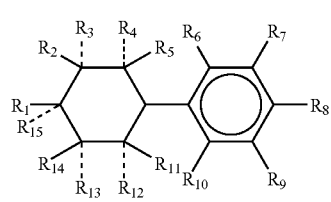

(III)

wherein $R_{(1,8)}$ of the compound of Formula III are individually a straight or branched alkyl group containing 1 to 50 carbon atom(s); and wherein $R_{(2-7,\ 9-15)}$ of the compound of Formula III are H.

8. The reverse mode liquid crystal display device of claim 1, wherein the nematic, negative dielectric anisotropic liquid crystal mixture comprises a compound represented by the following formula:

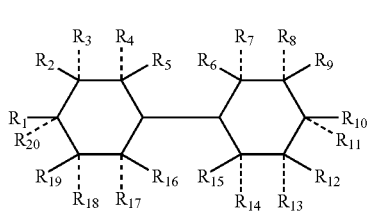

(IV)

wherein $R_{(1,10)}$ of the compound of Formula IV are individually a straight or branched alkyl group containing 1 to 50 carbon atom(s); and wherein $R_{11}$ of the compound of Formula IV is a cyano group; and wherein $R_{(2-9,\ 12-29)}$ of the compound of Formula IV are H.

9. The reverse mode liquid crystal display device of claim 1, wherein the nematic, negative dielectric anisotropic liquid crystal mixture comprises a compound represented by the following formula:

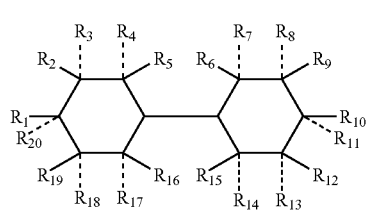

(IV)

wherein $R_1$ of the compound of Formula IV is a straight or branched alkyl group containing 1 to 10 carbon atom(s); wherein $R_{10}$ of the compound of Formula IV is a straight or branched alkyl group containing 1 to 7 carbon atom(s); wherein $R_{11}$ of the compound of Formula VI is a cyano group; and wherein $R_{(2-9,\ 12-20)}$ of the compound of Formula IV is H.

10. The reverse mode liquid crystal display device of claim 1, wherein at least one of the macrocyclic compound and borane comprises 1% to 5% by weight of the liquid crystal medium.

11. The reverse mode liquid crystal display device of claim 1, wherein the dielectric anisotropy $\Delta_E$ of the nematic, negative dielectric anisotropic liquid crystal mixture ranges from −1.0 to −5.0.

12. The reverse mode liquid crystal display device of claim 1, wherein the dielectric anisotropy $\Delta_E$ of the nematic, negative dielectric anisotropic liquid crystal mixture ranges from −1.0 to −3.0.

13. The reverse mode liquid crystal display device of claim 1, wherein the dielectric anisotropy $\Delta_E$ of the nematic, negative dielectric anisotropic liquid crystal mixture ranges from −1.0 to −2.5.

14. The reverse mode liquid crystal display device of claim 1 comprising the macrocyclic compound, wherein:
   $X_1$-$X_4$ of the macrocyclic compound N; and
   $R_1$-$R_4$ of the macrocyclic compound are individually H or $C_1$-$C_{10}$ alkyl.

15. The reverse mode liquid crystal display device of claim 1 comprising the borane, wherein:
   $R_1$-$R_4$ of the borane are individually ethyl;
   m of the borane is 12; and
   n of the borane is 12.

16. A reverse mode liquid crystal display device, comprising:
   a first substrate having an electrically conductive material associated therewith;
   a second substrate having an electrically conductive material associated therewith; and
   a liquid crystal medium contained within a chamber positioned between the first substrate and the second substrate the liquid crystal medium comprising:
      a borane and a macrocyclic ether in a solution of a nematic, negative dielectric anisotropic liquid crystal mixture;
      wherein the macrocyclic ether is neutrally charged;
      wherein the borane and the macrocyclic compound comprise 1% to 5% by weight of the liquid crystal medium; and
   wherein a dielectric anisotropy $\Delta_E$ of the nematic, negative dielectric anisotropic liquid crystal mixture ranges from −1.0 to −5.0.

17. The reverse mode liquid crystal display device of claim 16, wherein the macrocyclic ether is represented by the following formula:

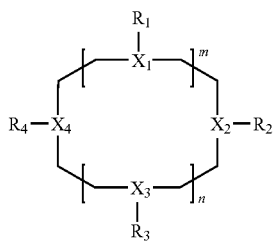

$X_1$-$X_4$ of the compound are individually O or N;
$R_1$-$R_4$ of the compound are individually H, $C_1$-$C_{10}$ alkyl, $C_1$-$C_{10}$ cycloalkyl, $C_1$-$C_{10}$ heterocycloalkyl, $C_1$-$C_{10}$ alkaryl, or $C_1$-$C_{10}$ aryl, or where any of $X_1$-$X_4$ is O, the corresponding $R_1$-$R_4$ is absent
m of the compound of Formula V is 1, 2, 3, 4, or 5;
n of the compound of Formula V is 1, 2, 3, 4, or 5.

* * * * *